(12) United States Patent
Sternowski et al.

(10) Patent No.: US 9,459,373 B2
(45) Date of Patent: Oct. 4, 2016

(54) OPTICAL SENSING SYSTEM

(71) Applicant: Softronics, Ltd., Marion, IA (US)

(72) Inventors: Robert Sternowski, Cedar Rapids, IA (US); James G. Sliney, Jr., Robins, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

(21) Appl. No.: 14/847,857

(22) Filed: Sep. 8, 2015

(65) Prior Publication Data

US 2016/0025556 A1 Jan. 28, 2016

Related U.S. Application Data

(62) Division of application No. 14/091,500, filed on Nov. 27, 2013.

(60) Provisional application No. 61/731,058, filed on Nov. 29, 2012.

(51) Int. Cl.
*G01J 1/42* (2006.01)
*G01V 8/20* (2006.01)
*G01V 8/14* (2006.01)

(52) U.S. Cl.
CPC . *G01V 8/20* (2013.01); *G01J 1/42* (2013.01); *G01V 8/14* (2013.01)

(58) Field of Classification Search
CPC ............. G02B 2027/0178; G02B 27/017; G02B 27/0093; G02B 2027/014; G02B 2027/0118; G02B 2027/0187; G02B 27/0172; G02B 5/30; G02B 27/0176; G02B 2027/0138; G02B 2027/0112; G02B 2027/0127; G02B 2027/01
See application file for complete search history.

(56) References Cited

U.S. PATENT DOCUMENTS

| | | | |
|---|---|---|---|
| 3,235,738 A | 2/1966 | Kress | |
| 3,641,320 A * | 2/1972 | Stockham | G01N 15/0227 356/335 |
| 3,742,222 A | 6/1973 | Endl | |
| 3,852,714 A * | 12/1974 | Carson | G01S 3/784 250/203.1 |
| 5,007,737 A | 4/1991 | Hirleman, Jr. | |
| 5,559,727 A * | 9/1996 | Deley | H05K 13/08 356/400 |
| 5,739,526 A | 4/1998 | Furstenau | |
| 6,600,153 B1 | 7/2003 | Ishizuka | |
| 7,161,687 B2 | 1/2007 | Pirinoli | |
| 7,570,360 B1 * | 8/2009 | Tkachuk | G01J 3/42 250/339.07 |
| 8,305,447 B1 * | 11/2012 | Wong | G08B 13/19602 348/151 |
| 8,482,720 B2 * | 7/2013 | Horsch | G01S 7/4802 356/3.01 |
| 2001/0000408 A1 | 4/2001 | Hair | |
| 2002/0041381 A1 | 4/2002 | Akishiba | |
| 2004/0104360 A1 | 6/2004 | Pirinoli | |
| 2004/0136100 A1 * | 7/2004 | Torii | G01V 8/14 359/831 |

(Continued)

*Primary Examiner* — Michael P Stafira
(74) *Attorney, Agent, or Firm* — Nyemaster Goode, P.C.

(57) ABSTRACT

An optical sensing system for detecting objects passing through a volume of interest, wherein the sensing system has an emitter and a detector. The detector detects motion of object shadows generated as the object passes through the volume of interest between the emitter and detector. Motion detection algorithms, using computed motion vectors of the detected object, logically determine whether an object has traveled completely through the detection space, and can be used to discriminate a specific outcomes and/or impediments.

9 Claims, 5 Drawing Sheets

(56) References Cited

U.S. PATENT DOCUMENTS

| | | | |
|---|---|---|---|
| 2005/0073693 A1* | 4/2005 | DePue | G06F 3/0317 356/499 |
| 2008/0198027 A1* | 8/2008 | Bugge | G01N 21/3504 340/632 |
| 2011/0043806 A1* | 2/2011 | Guetta | G01S 17/026 356/432 |
| 2011/0204211 A1 | 8/2011 | Klingelhoffer | |
| 2013/0077097 A1* | 3/2013 | Engstrand | G01N 21/31 356/437 |
| 2013/0248716 A1 | 9/2013 | Kulcke | |

\* cited by examiner

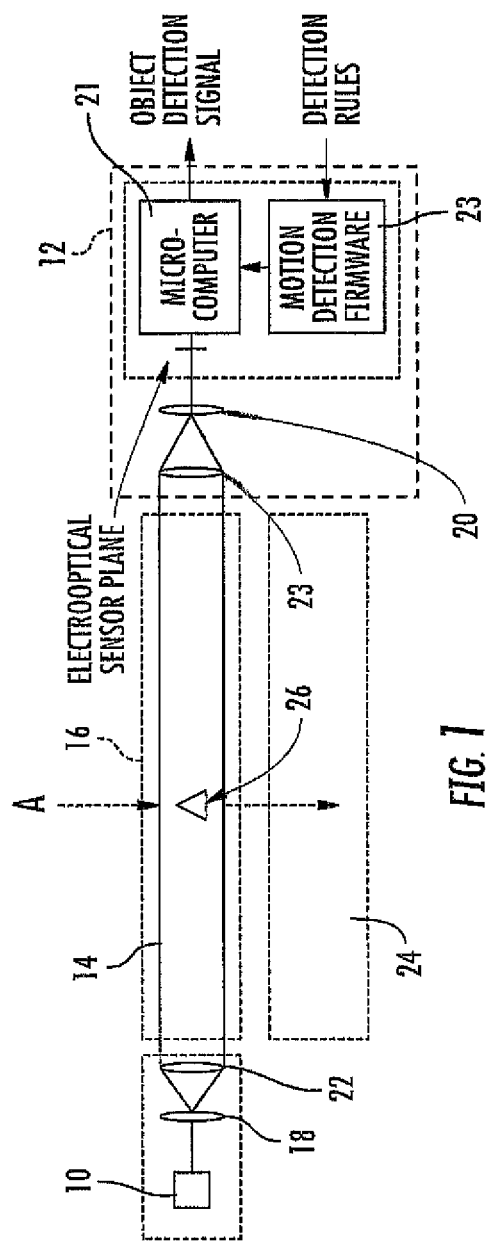
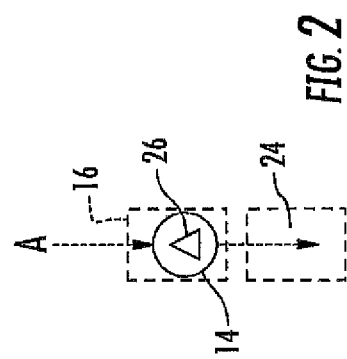

OPTICAL SENSING SYSTEM

This application is a divisional of U.S. application Ser. No. 14/091,500 filed Nov. 27, 2013, which is based upon and claims benefit to U.S. Provisional Application Ser. No. 61/731,058 filed Nov. 29, 2012, the complete disclosures of which are hereby expressly incorporated by this reference.

BACKGROUND

1. Field of the Invention

The present invention pertains to an optical sensing system for detecting moving objects. The sensing system may be used in any suitable application, including intrusion alarm systems, factory process monitors, vending machine dispensing sensors, and similar systems that require reliably sensing objects passing through a volume of interest. Although the invention may be used in any suitable application, for simplicity it will be described herein as used with a vending machine to detect whether an object has been properly vended.

2. Description of Related Art

In a typical vending machine, there is stored an array of articles ranging from small to large. Some vending machines contain relatively small objects such as metal screws, metal washers, or candy while other vending machines contain relatively large objects such as cans of soda and bags of snack foods. When a user makes the requisite payment or enters the proper access code to the machine and makes a desired selection on the selector panel, the selected product is released from its storage position by one of many known electromechanical mechanisms. It then tumbles downward, drawn by gravity, through a vend space between the front of the vend mechanisms and the back of the machine's front panel, into an outlet bin, from which the user can retrieve it. In many vending machines the machine's front panel is transparent thereby allowing the user to view the products before making a selection.

Several different problems may occur during the vending operation. For example, the vended product may get stuck in the machine before delivery to the user. Alternatively, the machine may dispense too many products to the user. Spatial orientation of packages and wrinkling of packaging, unusual random distribution of contents of a package, unusual random tumbling of a package through the vend space, an empty pocket in a dispensing mechanism, mis-feed of the dispensing mechanism, multi-feeds, and similar events all can cause mis-vending. In any case, certain actions need to be taken to provide a refund to the user, allow the opportunity to make another selection, or alert the machine owner that improper vending has occurred.

The physical characteristics of products dispensed from vending machines may vary widely. The products size may vary in volume and shape, typified by such product extremes as metalized plastic bags of snack food (typically 5×8×2 inches), thin paper cards (typically 3×5×0.060 inches), beverage cans (typically 6×2.5 diameter, inches), machine screws (1×0.125 diameter, inches), gum packages (typically 0.625×1.25×2.5 inches), and machine nuts (typically 0.125× 0.125×0.040 inches). Such typical products may randomly tumble in three dimensions, such that the profile presented along any axis during the dispensing process may vary from the thinnest dimension to the widest dimension.

It is known in the art to provide an emitter and detector which provide a beam in a confined space through which the vended product will fall. A processor determines when a vended product breaks the beam to confirm that the product has been vended properly. In prior art devices, however, there is some chance that the falling product, through random orientation will fail to break the beam, or will apparently fail to break the beam, and therefore not be detected. There is also a possibility that in constricting the space through which the product must fall, random orientation will cause the product to bridge and become lodged in the constricted space, having been detected but not having been successfully vended.

Others have provided vend sensors in which the impact on the outlet chute of a comparatively heavy vended article such as a can or bottle, is sensed as a vibration. However, such sensing is not economically feasible where at least some of the products being vended are very light in weight, such as is the case where a small number of large potato chips are presented in a facially large but light in weight package made of synthetic plastic film.

A particularly difficult situation is presented when some of the products to be dispensed are large so that a large transverse cross-sectional area is required for the vend space, but others of the products are so small that an optical beam meant to be broken by the product could be missed due to random path of movement and changing spatial orientation of the falling product being vended.

There is therefore a need for an improved sensing system which overcomes these and other deficiencies in the prior art.

SUMMARY

Accordingly, it is an object of this invention to provide an optical sensing system which detects an object as it passes through a volume of interest.

It is another object of this invention to provide an optical sensing system which detects objects ranging from small to large orientation and dimensional ratios.

It is another object of this invention to provide an optical sensing system which is robust against external light sources and against intentional attempts to disrupt the detection system.

In one embodiment, the optical sensing system of the present invention is comprised of a light beam produced by an emitter and detected by a detector assembly, which may be a mosaic detector. The light beam may be collimated by the emitter or it may be collimated by a lens assembly spaced a certain distance from the emitter. In one embodiment, the optical sensor system uses a light source that is quasi-monochromatic and detectors that have peak sensitivity near the frequency of the light source, which helps filter out any ambient light that is not at that frequency. One embodiment includes a filter which passes only the narrow wavelength of the light source, thereby substantially rejecting ambient interfering light, such as may pass through a glass front vending machine, that may otherwise block or confuse the optical sensors. Lenses may be used to help remove ambient light that does not travel along the optical axis of the collimated light by directing it off axis so that it does not get focused on the detector. The optical sensing system of the present invention eliminates the problem of previous systems that require elaborate techniques to remove interference from ambient light and require extensive calibration to ensure that objects are detected.

For ensuring that a vending machine dispense cycle will continue until a product has descended through a volume of interest or an established time interval has elapsed, an optical beam produced by an emitter is established across the volume of interest through which a product must drop.

The volume of interest in vending applications is referred to as the vending space. The beam may be projected across the vending space in either a vertical or horizontal direction, or a combination thereof. The beam has a first end and a second end where the first end is adjacent to the emitter and the second end is adjacent to the detector. Preferably, the beam is a tightly collimated light source, typically generated by a laser or light emitting diode (LED). If the light source is not collimated at the time of emission, one or more optical lenses may be used to collimate the light before it travels across the vending space. The beam may be any geometrical shape, including round. In one embodiment, the cross-section of the beam may be set (expanded) to fill the desired vending space according to the optics design. At the second end of the collimated light beam (e.g. the end opposite the emitter), an optical lens system focuses the collimated beam into a detector, which may be a mosaic detector such as a video motion sensor. The collimated beam allows reliable detection of very small objects because the relatively high number of individual photons that constitute the collimated light beam. The beam travels in a straight line (the optical axis) and is less susceptible to diffusion relative to non-collimated beams. The optical design of the collimating lenses sends the beam of light to the collecting lens system for the detector in such a manner that ambient light does not align with the optical axis of the direction of the beam of light and is not focused on the detector, because it is off axis. As described in more detail below, during operation a portion of the collimated beam is blocked by an intervening vended object passing through the vending space to produce a distinct shadow at the detector relative to the normal intensity of the light beam reaching the detector.

In addition to detecting the presence or absence of an object in the vend space, in some embodiments the detector can also detect the motion of dispensed object shadows generated as the dispensed object passes downward through the vending space. Detection of shadows (as opposed to front surface images) eliminates the need to process wide variations in color and reflectivity of the dispensed product. Motion detection algorithms, using computed motion vectors of the dispensed product, logically determine that a dispensed product has traveled completely through or has stalled within the vending space, and can be used to discriminate a specific vending cycle outcome and/or impediments. As described below, the detection algorithms may be set to detect items moving in a certain direction, at a certain speed or range of speeds, or items of a certain size or range of sizes.

In some embodiments, the detector is programmed with a set of rules to determine the range of motion vectors which the user has predefined as a successful vending cycle, thereby causing a logical output to be issued indicating to the vending machine that a successful dispensing action has occurred. In some embodiments a rule may be created which defines a successful vending cycle only if a shadow is detected in the downward direction moving at a predetermined velocity. Motion detection algorithms may be modified to allow the predetermined velocity, size, and direction characteristics to be tailored to user preferences for the properties of the vend object(s). In some embodiments the user may also define one or more separate sets of rules that define a static blockage of product (shadow with no motion), an attempt to enter the machine from the vending access opening in a theft attempt (shadow moving in the wrong direction), or other criteria as needed by the end use of the system. In some embodiments a rule may be created which instructs the machine to take no action if a stationary shadow having a predetermined size is detected.

In another embodiment, a system of one or more reflecting mirrors is interposed between the emitter and the detector for the purpose of reflecting the beam back and forth across the vending space any desired number of times to further illuminate the vending space by the multiple beam passes, with the intent of minimizing gaps between beam passes through which an object may pass undetected. This embodiment operates identically to the first embodiment, but allows use of a smaller cross-section optical lens system to cover the vending volume by employing multiple parallel collimated light beams rather than a single large diameter collimated beam.

BRIEF DESCRIPTION OF THE DRAWINGS

Embodiments of the invention are described in more detail with reference to the attached drawings, in which:

FIG. 1 is a block diagram showing an embodiment of the invention.

FIG. 2 is a side view of the block diagram shown in FIG. 1.

DETAILED DESCRIPTION

The present invention is related to an optical sensing system for use in any suitable application, including for sensing objects dispensed from a vending machine. The invention is equally applicable to any suitable vending machine having a volume of interest 16 (vend space) through which an object 26 must pass, independent of the specific electromechanical design and construction of the vending machine.

Figure 8:
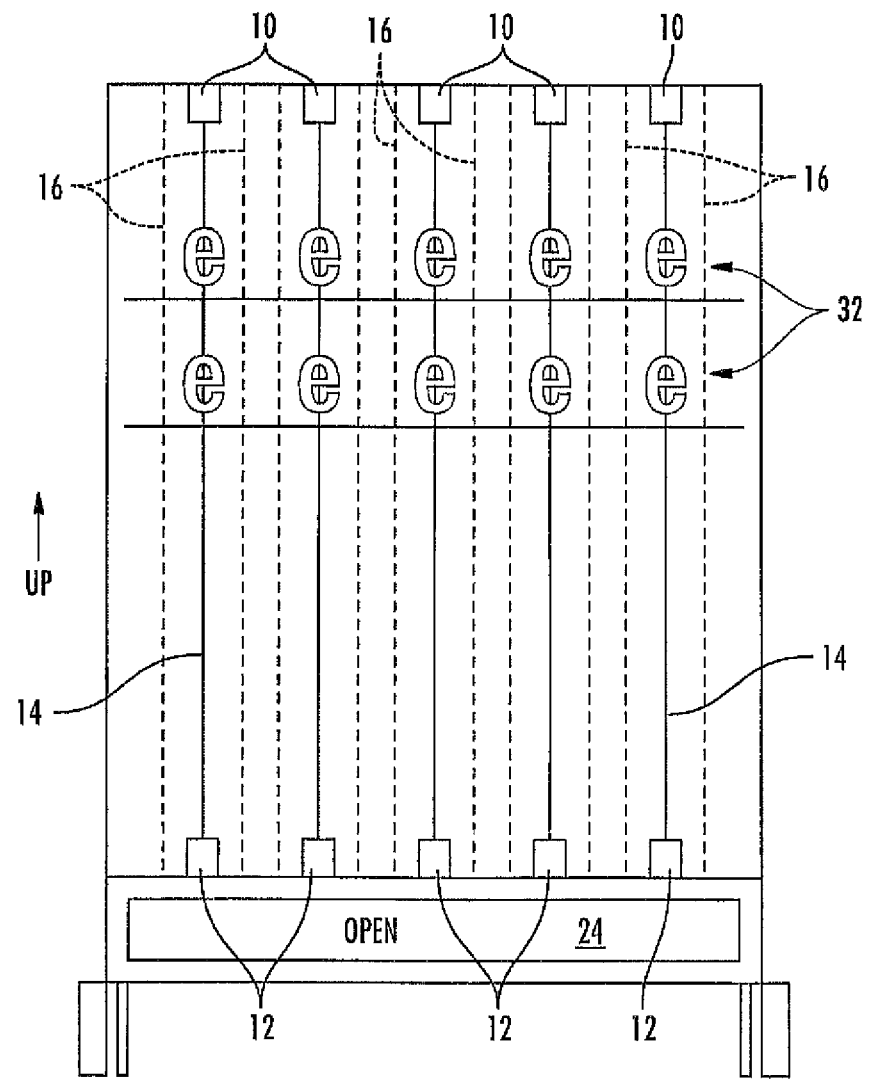
FIG. 8 is a front view of a vending machine showing an embodiment of the sensing system wherein the beam(s) is(are) oriented vertically to detect a vertical vending space.

One embodiment of the optical sensing system is schematically and diagrammatically illustrated in FIG. 1 in which an emitter 10 projects a beam 14 of electromagnetic radiation (light) to a detector 12. As illustrated below with reference to some specific embodiments, the beam 14 may be oriented in any suitable direction within the volume of interest 16. For example, the beam 14 may be projected in one or more of front/back, left/right, up/down, or any angle therebetween. As shown in FIG. 8, for example, it is not necessary for the beam 14 to be projected at a right angle to the direction of travel of the vended object 26 as long as the vended object 26 is capable of breaking the beam 14 as it is being vended. The beam 14 has a first end adjacent to the emitter 10 and a second end adjacent to the detector 12. In FIG. 1, the emitter 10 and detector 12 are adapted to be combined with opposite interior sides of the volume of interest 16. The emitter 10 projects a single light source such as beam 14 and the detector 12 is adapted to detect the beam 14 and may be a single video sensor or mosaic detector. The beam 14 cross-section and orientation are selected to substantially span the volume of interest 16 for the product 26 to be dispensed. The arrow A in FIGS. 1 and 2 shows the direction of travel of the product 26 being dispensed.

Any suitable emitter 10 may be used, including a laser diode, light emitting diode ("LED"), gas laser, incandescent light, fluorescent light, and high pressure gas discharge light. Power for the emitter 10 is typically provided from a conventional external power source, but may be integrated into the emitter 10 in some embodiments (such as battery power). In embodiments using a laser diode as the emitter, the laser diode power required for a typical vending machine application is typically five milliwatts or less, well below safety thresholds even without beam expansion. The intensity of the light generated by the emitter 10 is proportional to the distance the light must travel from the emitter 10 to the detector 12. If desired, the emitter 10/detector 12 system may be switched on by the vending machine master controller only when a vend cycle is in progress in order to conserve power when not in use.

In one embodiment the wavelength of the beam 14 created by the emitter 10 may be selected by the user according to the choice of detector 12 or the ambient interfering light characteristics so as to optimize system performance. In areas where significant amounts of ambient light will reach the detector 12, it may be desirable to select or limit the wavelength of light coming from the emitter 10 then tune the detector 12 to only detect the selected wavelength. This allows the system to tune out all wavelengths of ambient light except the one(s) selected by the user. This eliminates the need for calibration and synchronization functions which are required in prior art device. Red light (635 nm) is used in one embodiment One embodiment includes a filter which passes only the wavelength of the emitted beam 14, thereby substantially rejecting ambient interfering light from reaching the detector 12.

In the embodiment shown in FIG. 1, a lens assembly is used to increase the diameter of the beam 14, then collimate the expanded beam 14, then refocus the beam 14 as it enters the detector 12. The lens assembly includes one or more of a first lens 18 which may be an expanding lens for expanding the beam 14 to an expanded diameter. A second lens 22 which may be a collimating lens for collimating the expanded beam to create a beam of light 14 comprised of generally parallel light rays of the desired final diameter. Typically the first two lenses 18, 22 are positioned near the first end of the beam 14 (near the emitter 10). A third lens 23 which may be a decollimating or first focusing lens for focusing the incoming collimated beam 14 to an intermediate diameter. A fourth lens 20 which may be a secondary focusing lens for focusing the intermediate beam 14 to a smaller size commensurate with the design of the specific detector 12. The focused light is applied to the optical port of the detector 12 for analysis by the processor 21. Typically the second two lenses 23, 20 are positioned near the second end of the beam 14 (near the detector 12).

In addition to expanding the diameter of the beam 14 and collimating the beam 14 through the volume of interest 16, the lens assembly also serves to help prevent ambient light from reaching the detector 12 and interfering with detection. Ambient light which does not pass through one or more of lenses 22 and 23 at a specific angle (i.e., the angle of the light coming from the emitter 10) is directed by the lens 22, 23 off-axis to a focal point away from the detector 12.

One or more of the emitter 10, detector 12, and lens assembly components may be mounted in one or more housings to help secure the components in their proper locations.

Figure 9:
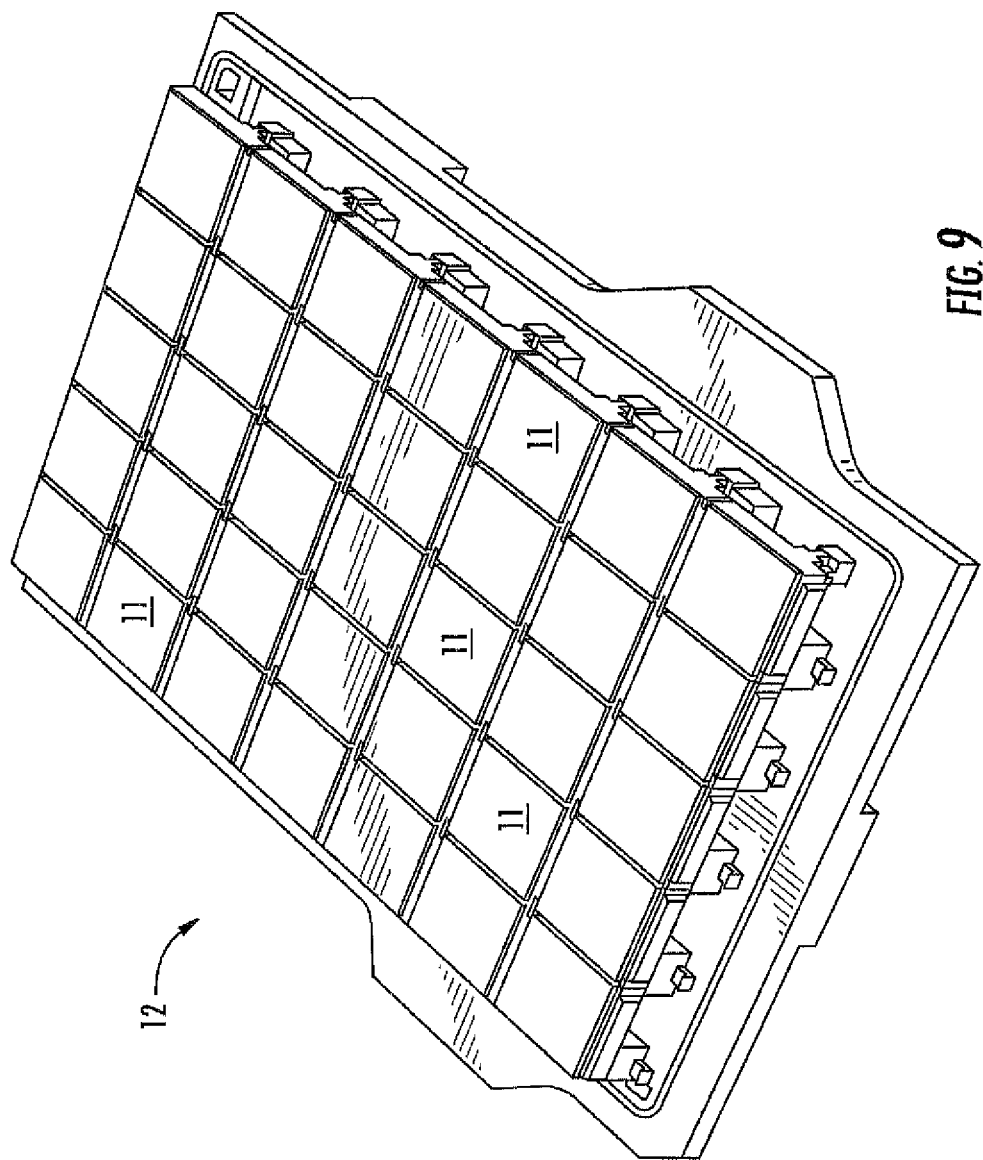
FIG. 9 is a perspective view of a mosaic detector showing the plurality of detection elements.

In one embodiment, the detector 12 is a subsystem comprising a mosaic of photo detectors 11, a video processing means, motion algorithms, and rule programming. The mosaic of photo detectors 11 may have a defined array size and may be a video camera pixel array. An exemplary mosaic detector is shown in FIG. 9 wherein the detector 12 comprises a plurality of detection elements 11. Each detection element 11 is able to independently determine relative light levels such that full or partial shadows (relative to the normal intensity of the beam 14) cast on the detection elements 11 can be detected. Thus, motion, velocity, and size can be detected by the subsystem as an object 26 passes in front of the detection elements 11 as each individual detection element 11 sees changes in light levels. The mosaic sensor array provides better detection of objects passing through the beam of light 14 from the source, because it has a better signal to noise ratio compared to a linear array which has a better signal to noise ratio compared to a single detector. The mosaic sensor array can identify the direction an object is traveling as it passes through the beam 14 which the single detector and the linear array are not able to do. The one exception for the linear array is the special case for an object that is traveling parallel to the direction of the linear array.

The detector subsystem is typically integrated into a single, small circuit, which may include or otherwise be in communication with a processor 21 and firmware 23. The subsystem can determine direction, position, velocity, and acceleration of objects passing in front of the array of detection elements 11. The subsystem allows direct programming of rules (using various internally determined parameters, i.e., delta-x, delta-y, x-acceleration, y-acceleration, smoothing, x-velocity, y-velocity, etc.) into the device to define under what conditions a logical output state may be defined and so indicated. Such detector subsystem may include a processing function, typically expressed as N×M pixels (of the detection element 11 array), which output is used by the motion detection algorithms to extract the internal motion parameters. The video processing means is typically implemented in firmware 23 and/or in a processor (microcomputer) 21 to perform mathematical operations on the data values detected by the detection element 11 array. This allows the device to compare complex manipulations, apply mathematical functions, and compare matrix values with matrix values from a previous time of pixel light levels. The video processing compares patterns of light levels between frames, and makes decisions and inferences about the differences based on the rules and motion algorithms.

Some embodiments include methods of using the optical sensing system wherein one or more rules are created to define a successful vending cycle. Sensing of a product drop through the beam 14 involves comparing the vectors of any detected shadows reported by the motion detection algorithms of the detector 12. The motion detection algorithms are typically implemented in firmware 23 and/or in a processor (microcomputer) 21. If the reported vectors meet the requirements of the predefined rules, a dispense action logical signal is provided to the vending machine master controller. Further actions may be undertaken by the vending machine based upon this signal.

In one embodiment, a successful vending cycle is only achieved if a shadow is detected in the downward direction and/or is moving at a predetermined velocity. Motion detection algorithms may be modified to create rules which allow the predetermined velocity, size, and direction characteristics to be tailored to user preferences, or to specifically match each of a plurality of vended objects. In some embodiments the user may also define one or more separate sets of rules that define a static blockage of product (shadow with no motion), an attempt to enter the machine from the vending access opening in a theft attempt (shadow moving in the wrong direction), or other criteria as needed by the end use of the system. In some embodiments a rule may be created which instructs the machine to take no action if a stationary shadow having a predetermined size is detected.

The motion detection algorithms may vary widely depending on the speed of motion desired for detection. A first step is to determine the light level on all pixels in the detection element array 11 and to store those values in the processor's 21 buffer memory. Then the light level is determined again for all pixels in the array 11 a predetermined time after the initial light levels are determent (usually fractions of a second) and the second value is compared to the first value (in the buffer memory). A matrix of the differences between the two values is created and stored to buffer. The process is continued as light levels at a first time are compared to light levels at a second (later) time. The matrix of differences between the light levels at the first time and light levels at the second time are continually compared by the processor 21. From the comparison of difference matrices, the direction and displacement of the differences is determined to give speed and direction (velocity). Further, the comparison of difference matrices can be used to determine the size of the object projected on the mosaic as larger objects will darken more detection elements 11 at a given time.

The detector 12 having the array of detection elements 11 detects the shadow of the vended object as the object passes in front of the beam 14. The motion detection algorithms continuously analyze the relative differences and changes in the light falling on each element of the array 11. The shadow may only be a slight darkening of a pixel or trail of pixels relative to the normal beam 14 intensity, rather than a total light/dark transition. The motion detection algorithms function with shades of gray in addition to total light/dark changes such that there is not a hard optical threshold at which detection occurs. The impact of brightness, and more specifically dealing with wide variation in dispensed product front surface color and reflectivity, is eliminated by the use of vend product shadows to be sensed by the invention. The motion detection algorithms examine and make decisions based on the relative differences among the pixels of the array 11 generated by the impinging shadow.

The smallest dispensed product detectable by the invention is one pixel area divided by the number of levels of gray scale. For example, if sixty-four levels of gray scale exist, then an object shadow $\frac{1}{64}$th of the pixel area will cause a one-step light level output change detectable by the detector 12.

A number of embodiments are possible to accommodate various volume of interest 16 geometries and physical vending machine implementations. FIGS. 1, 3, 5, and 7 show an embodiment wherein the emitter 10 is positioned at a first end of the volume of interest 16 such that the resulting collimated light beam 14 is directed across the desired axis/area of the volume of interest 16 to the detector 12 at a second end of the volume of interest 16 where the detector 12 monitors for dispensed products 26 falling from a tray assembly 32 within the vending machine. During normal operation, the dispensed products 26 fall into a bin 24 for retrieval by the consumer. In other words, in these embodiments, the first end of the beam 14 is projected from the first side of the volume of interest 16 and the second end of the beam 14 is received by a detector 12 at the opposite side of the volume of interest 16. In contrast, FIGS. 4 and 6 show embodiments where the beam 14 is reflected back to the first side of the volume of interest 16 by a mirror to allow the emitter 10 and detector 12 to be located on the same side of the volume of interest 16.

Figure 3:
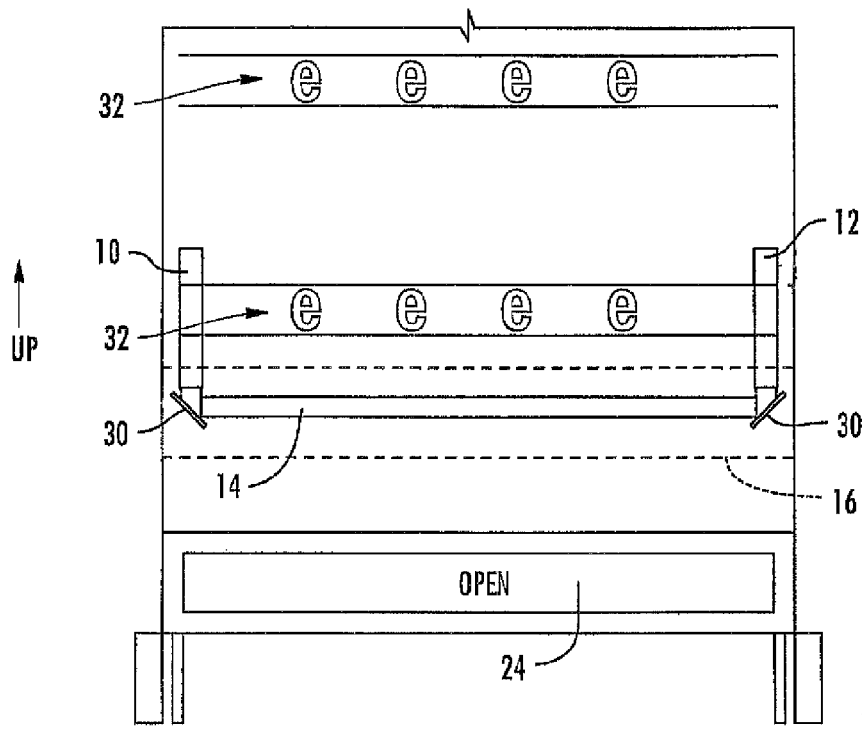
FIG. 3 is a front view of a vending machine showing any embodiment of the sensing system wherein the emitter and detector are located above the volume of interest.

FIG. 3 shows an embodiment wherein the emitter 10 and detector 12 are used with right angle mirrors 30 in order to conserve width within a vending machine. In the embodiment shown, the emitter 10 and detector 12 may be located above the volume of interest 16 while the beam 14 is projected horizontally across the volume of interest 16 using mirrors 30.

Figure 4:
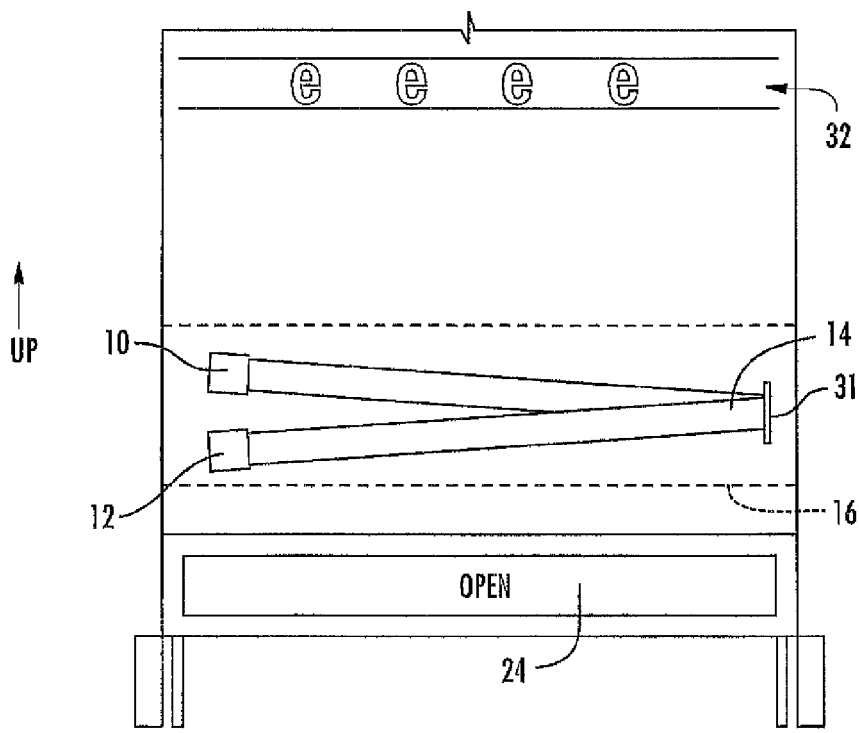
FIG. 4 is a front view of a vending machine showing any embodiment of the sensing system wherein the beam is reflected off of a mirror thereby providing the emitter and detector are on the same side of the machine.

FIG. 4 shows an embodiment using a mirror 31 to reflect a single beam 14 back to the detector 12 located on the same side as the emitter 10. This embodiment allows a single beam 14 to traverse the volume of interest 16 twice thereby increasing the detection area covered by the single beam 14.

Figure 5:
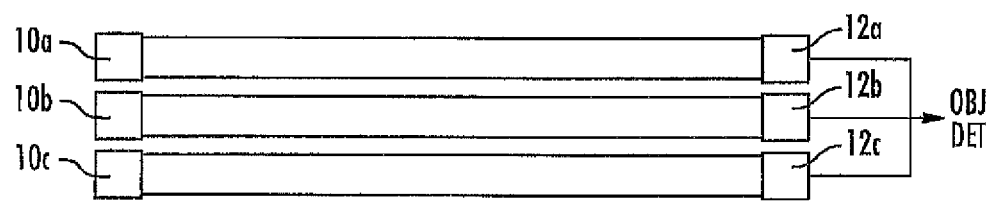
FIG. 5 is a top view of an embodiment of the sensing system wherein multiple autonomous emitter and detector pairs create multiple beams traversing the volume of interest.
Figure 6:
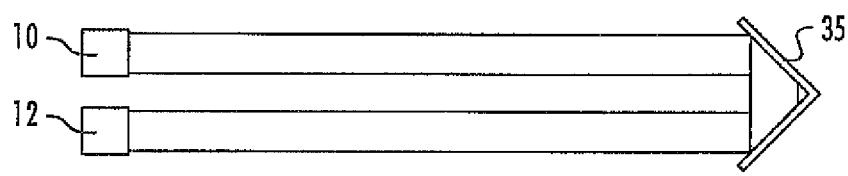
FIG. 6 is a top view of an embodiment of the sensing system wherein a folding mirror is used to increase the volume of interest covered with a single emitter source and single detector.

FIG. 5 is a top view showing an embodiment using multiple emitter 10a, 10b, 10c/detector 12a, 12b, 12c pairs with each beam 14 traversing a different area of volume of interest 16. It will be understood that any suitable number of emitter 10/detector 12 pairs may be used. Each emitter 10a, 10b, 10c/detector 12a, 12b, 12c operates autonomously to provide independent information to the processor 21. The logical outputs can be logically combined in a desired manner or used separately so as to divide the volume of interest 16 into sectors. This embodiment may be used when it is important to know which sector of the volume of interest 16 a product has passed through.

FIG. 6 is a top view showing an embodiment wherein a folding mirror 35 (corner reflector) is used to double the monitored vending space 16 using only a single emitter 10 and detector 12 pair. It is irrelevant to the operation of the vending machine in which pixel(s) motion is detected, just that motion was detected somewhere. In this embodiment the emitter 10 and detector 12 are located on the same side of the vending space 16.

Figure 7:
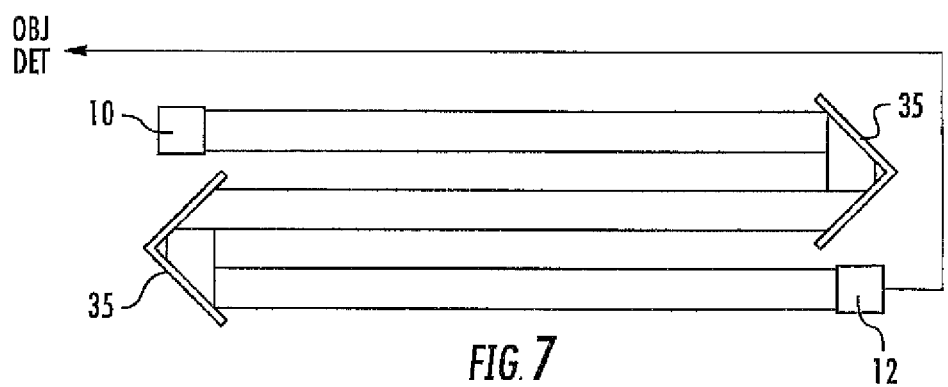
FIG. 7 is a top view of an embodiment of the sensing system wherein multiple folding mirrors are used to increase the volume of interest coverage with a single emitter source and single detector.

FIG. 7 is a top view of an embodiment wherein multiple folding mirrors 35 to monitor a larger vend space with only a single emitter 10/detector 12 pair. This expands the embodiment of FIG. 6 with additional folds of the beam 14. Additional numbers of mirrors 35 may be used to further fold the beam 14 to increase the detection area of the vending space 16. The number of folds that can be applied is limited only by the source brightness, mirror reflectivity, and tightness of collimation (beam divergence). Further, the gap between the beam 14 as it passes back and forth across the vending space 16 may be adjusted to user preference. In one embodiment, the mirrors 35 can be adjusted such that there is little or no gap between the reflected beam 14.

FIG. 8 shows an embodiment wherein the beams 14 traverse the volume of interest 16 in a vertical direction. In the embodiment shown, a plurality of emitters 10 are positioned near the top (first end) of the machine and a plurality of corresponding detectors 12 are positioned near the bottom (second end) of the machine such that the emitters 10 create a vertical beam 14 through the volume of interest 16 which are received by the detectors 12. In other embodiments the components may be reversed such that the detectors 12 may be near the top and the emitters 10 near the bottom. This embodiment is beneficial if it is important to know which column of products has been vended. In still other embodiments mirrors may be used to reflect a single beam 14 in generally parallel vertical alignment (similar to FIG. 7 if it were rotated ninety degrees) to sense products vended from different trays.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included with in the scope of the following claims.

What is claimed is as follows:

1. A method of detecting an object passing through a volume of interest in a first direction using an optical sensing system, said method comprising:
   activating an emitter to generate a light beam that substantially spans said volume of interest and has an intensity and a diameter;
   expanding the diameter of the light beam by directing the light beam through a lens assembly to create an expanded light beam;
   collimating the expanded light beam by directing the expanded light beam through the lens assembly to create a collimated light beam;
   focusing the collimated light beam at a mosaic detector having a plurality of light detecting elements along a length and a width, each detecting element able to independently detect changes to the intensity of the light beam;
   detecting shadows falling on each of the light detecting elements caused by the object moving through said volume of interest;
   programming a processor with motion detection algorithms to determine whether the detected shadows meet a certain pattern as movement of the object is detected.

2. The method of claim 1 wherein the certain pattern is a shadow moving in the first direction.

3. The method of claim 1 wherein the certain pattern is a shadow moving in a second direction.

4. The method of claim 1 wherein the certain pattern is a shadow having a predetermined size.

5. The method of claim 1 wherein the emitter is a light emitting diode.

6. The method of claim 1 wherein the emitter is a laser.

7. A method of detecting an object passing through a volume of interest in a first direction using an optical sensing system, said method comprising:
   activating an emitter to light beam having a predetermined wavelength that substantially spans said volume of interest and has an intensity and a diameter;
   expanding the diameter of the light beam by directing the light beam through a lens assembly to create an expanded light beam;
   collimating the expanded light beam by directing the expanded light beam through the lens assembly to create a collimated light beam;
   focusing the collimated light beam at a mosaic detector having a plurality of light detecting elements along a length and a width, each detecting element able to independently detect changes to the intensity of the light beam;
   detecting shadows falling on each of the light detecting elements caused by the object moving through said volume of interest;
   programming a processor with motion detection algorithms to determine whether the detected shadows meet a certain pattern as movement of the object is detected.

8. The method of claim 7 further comprising tuning the detector to have a peak sensitivity at the wavelength of the emitted light.

9. A method of detecting an object passing through a volume of interest in a first direction using an optical sensing system, said method comprising:
   activating an emitter to generate a light beam that substantially spans said volume of interest and has an intensity and a diameter;
   expanding the diameter of the light beam by directing the light beam through a lens assembly to create an expanded light beam;
   collimating the expanded light beam by directing the expanded light beam through the lens assembly to create a collimated light beam;
   focusing the collimated light beam at a mosaic detector having a plurality of light detecting elements along a length and a width, each detecting element able to independently detect changes to the intensity of the light beam;
   detecting shadows falling on each of the light detecting elements caused by the object moving through said volume of interest;
   programming a processor with motion detection algorithms to determine whether the detected shadows meet a certain pattern as movement of the object is detected;
   wherein the light beam travels along an optical axis and the lens assembly is shaped to focus light which is not traveling along the optical axis away from the mosaic detector.

* * * * *